Figure 1:
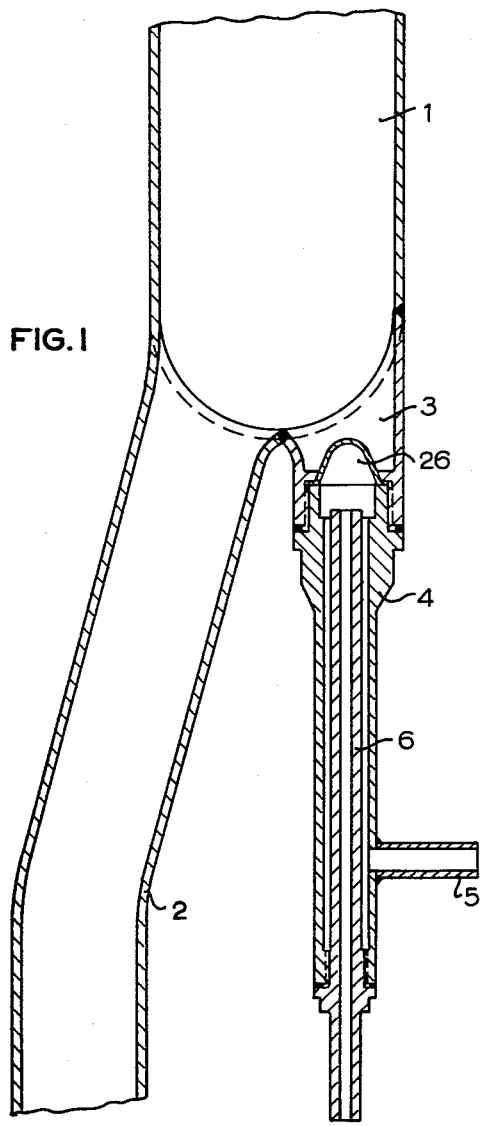

July 31, 1962 J. C. VAN DINTEREN 3,046,791
SAMPLER FOR FLOWING LIQUIDS
Filed Sept. 12, 1960 2 Sheets-Sheet 1

Inventor
Johannus C. Van Dinteren
By Cushman, Darby & Cushman
Attorneys

United States Patent Office 3,046,791
Patented July 31, 1962

3,046,791
SAMPLER FOR FLOWING LIQUIDS
Johannus C. van Dinteren, Geleen, Netherlands, assignor to Stamicarbon N.V., Heerlen, Netherlands
Filed Sept. 12, 1960, Ser. No. 55,415
Claims priority, application Netherlands Sept. 12, 1959
10 Claims. (Cl. 73—422)

The present invention relates principally to a sampler for flowing liquids and more particularly to a sampler for continuously diluting, filtering and withdrawing samples from a flowing liquid.

In the case of flowing liquids that contain solid particles, such as crystals, it is difficult, to take a reliable sample continuously, e.g. by way of a branch conduit. The automatic control of a process is not satisfactory unless there is continuous sampling since automatic discontinuous sampling is very cumbersome and time-consuming, generally not sufficiently accurate and does not permit continuous adjustment of controls.

The present invention provides a sampler capable of operating continuously without interference from crystals and the like. It is characterized by a screen which connects on one side with a flow passage for the liquid to be sampled, but is separated therefrom by a small space or chamber between the screen and the zone of flow in the passage. On its other side, the screen communicates with two conduits, one for the supply of a liquid diluent and one for the discharge of diluted liquid.

The stream of liquid diluent is continuous and has a constant flow rate. It passes through the screen, washes away the crystals and the like that might have collected on the screen and mixes with the liquid between the screen and the flow passage. Then the diluted liquid flows through the screen and is discharged through the appropriate conduit. Surprisingly, when the screen is located in a "dead recess" along the zone of flow, no liquid diluent gets into the main stream, but there is a continuous flow of fresh liquid to be sampled into the recess owing to the suction effect caused by continuous discharge of diluted liquid.

Preferably the sampler extends vertically with the outlet from the liquid passage above the screen. It is further preferred that the screen is substantially dome-shaped, the convex side of the dome pointing upwardly and communicating with the flow passage. In this embodiment the liquid tends to flow downwardly through the screen under the influence of gravity, and the crystals which land on the screen will readily roll downwardly along the dome, after which they are driven vertically upwardly at the edge by the in-flowing diluent liquid. Consequently, the mixing of the sampling and diluting liquids will take place substantially over the top of the dome and will not be disturbed by the transport of crystals.

The two conduits underneath the screen may be arranged concentrically and may extend vertically with the diluent entering through the outer tube and diluted liquid being withdrawn through the inner tube. As a result, separation of the mixing zone from the zone of the upward transport of crystals along the outside of the chamber is furthered by the uniform flow of diluent liquid to the outer edges of the screen, and there will be a generally counter-current flow of diluent and diluted sample liquid in the chamber above the screen.

The sampler can be successfully employed for many purposes, including the determination of the hydrogen-ion-concentration of a flowing liquid. According to one feature of the invention, liquid is led from the main liquid flow through a bypass, and a constant stream of liquid diluent is continuously fed to a space communicating with the liquid flowing in the bypass outside the main zone of flow. Diluted liquid is discharged from that space and subsequently passed to a pH meter which may generate an electric control signal used to regulate the addition of acid or base to the flowing liquid to maintain constant pH. This has the advantage that, under certain conditions, the pH of the diluted liquid is in a range in which the pH meter is more sensitive. For example, the meter may be more sensitive to small differences in pH at low acidity than at high acidity so that the dilution of a relatively concentrated solution of a strong acid will adjust its pH to a range more suitable for precise measurement. Since the degree of dilution is known, it is simple to compute the pH of the solution before dilution.

The above-described sampling process has made it possible to control a saturator, such as an ammonia saturator, in such a way that a sample is taken from a branch or bypass line of the saturator and passed to a pH meter and the pH measurement can automatically control adjustment of the feed rate of the sulphuric acid and/or ammonia. In this case, water may be used as the liquid diluent. The degree of dilution (abtn. 1:80) is such that the pH range of the diluted liquid is more easily measured with precision, since a pH in the order of 3 instead of 0.5 is measured.

Figure 2:
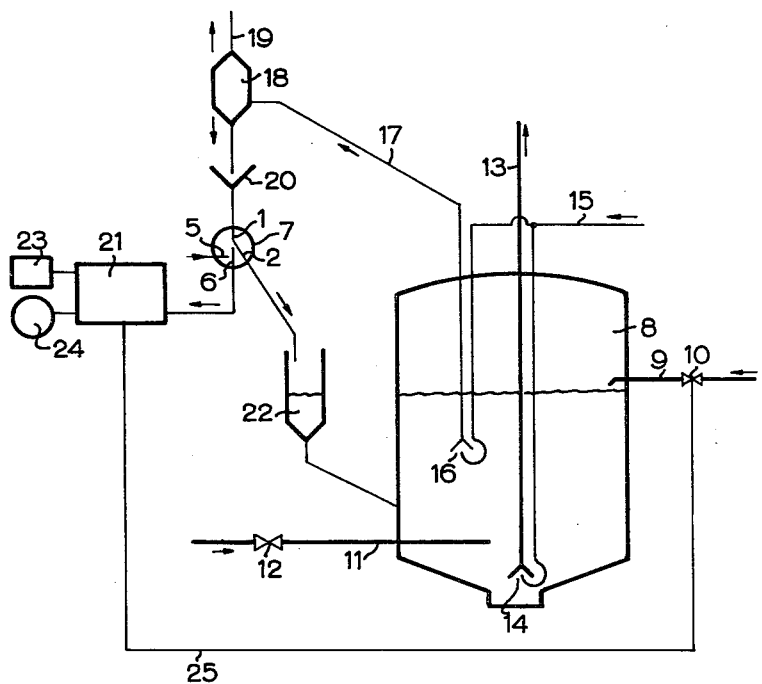

The invention may be better understood from the following detailed description of preferred embodiments and from the drawings in which:

FIGURE 1 shows an embodiment of a sampler; and
FIGURE 2 is a flow diagram of an ammonia saturator, including a sampler according to the invention.

In the drawings, FIG. 1 shows a full-sized sampler that meets the requirements in a special case. The numerals 1 and 2 in the drawings refer to the flow passages for the liquid to be sampled, which liquid is admitted at 1. In a space 3 outside the zone of flow, i.e. a "dead recess," a dome-shaped screen 26 is located. Connected with this space is a pipe, 4 opening below the screen which is provided with a branch pipe 5 through which the liquid diluent is fed. Centrally positioned in the pipe 4 is a capillary 6 through which the diluted liquid is drawn from the recess, through the screen and is discharged. In this embodiment, the sampler is at the end of flow passage 1 and flow passage 2 branches off so that the main body of fluid flowing along passage 1 is directed against the sampler as it turns into passage 2.

The recess should be at least so high and the relationship between its width and height should be such, that the liquid in the neighbourhood of the screen will not be refreshed by the flowing liquid when the pipe 5 and the capillary 6 are closed.

The liquid diluent flowing into the recess preferably has a velocity of at least such that a diluted liquid can be drawn through the capillary 6 with a favorable pH to measure, but the velocity should not be so great that diluent liquid will be carried beyond the recess and into the main liquid flow.

While the sampler has been shown facing upwardly against downflowing liquids, other positions and other orientations with respect to the direction of flow of the main liquid may be used.

The screen openings should be sufficiently small to prevent passage of solids while not interfering with the free flow of liquid.

The use of the sampler is shown in FIGURE 2 and the sampler of FIGURE 1 is indicated to be within the circle 7. Into an ammonia saturator 8, sulphuric acid is fed by way of the feed line 9, the feed rate being controlled by means of the valve 10. Ammonia is fed in by way of the feed line 11, the feed rate being controlled by means of the valve 12. Ammonium sulphate is discharged through the line 13 with the aid of an ejector 14 which is fed by steam or air via the line 15. A small ejector 16 is provided for the sampling process. Its discharge line 17 is tangentially connected to a cylindrical vessel 18, in which the liquid is separated from gases and vapours. The latter leave the vessel through the discharge line 19 and the liquid is collected in a funnel 20. Then the liquid is passed through the sampler 7 which corresponds to the sampler in FIGURE 1, as has been mentioned before. Water is supplied through the branch line 5. The sample passes through the line 6 to the pH meter 21 and the main stream in the conduit 2 falls into the receptacle 22 through which the liquid is passed back to the saturator. The numeral 23 refers to a recording instrument and the numeral 24 to an indicating instrument for recording and indicating pH. The electric wire 25 denotes that the valve 10 can be controlled by the pH meter. Since the degree of dilution is kept constant by means of the sampler 7, the pH to be determined by means of the pH meter 21 is directly dependent on the pH and consequently on the amount of free sulphuric acid in the saturator. By using the pH to generate a control impulse, the sulphuric acid can be fed at such a rate that the composition of the liquid in the saturator remains constant.

The scope of the invention is not restricted to the above-described control process nor to sampling for the purpose of pH measurement. The sampler may also be used in a conductivity test or other tests in which it is necessary to continuously withdraw and dilute samples from a flowing liquid. Finally, it should be noted that the present invention is not restricted to the above-described vertically-arranged, closed sampler, or other details of construction and many variants are within the scope of the invention which is defined in the claims.

I claim:

1. A sampler for continuously withdrawing, diluting and filtering samples from a flowing liquid comprising a screen, first conduit means for directing diluent liquid against one surface of said screen, second conduit means for removing diluted liquid from adjacent said surface, a chamber adjacent the other surface of said screen and means for connecting said chamber to a passageway through which the first said liquid is flowing whereby diluent liquid is supplied through said first conduit means and flows through said screen to clear it of solids and diluted solid-free liquid is continuously withdrawn through said second conduit.

2. A sampler as set forth in claim 1 in which the screen is dome-shaped and the central portion of said screen extends into said chamber.

3. A sampler as set forth in claim 1 in which said first conduit means surrounds said second conduit means and is positioned to direct diluting liquid against the outer edge portions of said screen, diluted liquid being withdrawn through the inner portion of said screen and said second conduit means.

4. A sampler as set forth in claim 1 including a passageway for carrying the liquid to be sampled, said sampler being connected to said passageway to withdraw liquid therefrom.

5. A sampler as set forth in claim 4 in which the screen is positioned vertically below the connection between said chamber and said passageway.

6. A sampler as set forth in claim 5 in which the openings of said conduit means are positioned beneath said screen to propel liquid up to and draw liquid down from said screen.

7. A sampler as set forth in claim 6 in which said screen is dome-shaped with the top of the dome above the base.

8. A sampler as set forth in claim 6 in which the sampler is connected to said passageway with said chamber open generally perpendicularly to the direction of flow of liquid in the passageway whereby part of the flowing liquid is directed into said chamber while the remainder flows past the chamber.

9. A method of continuously withdrawing and diluting samples from a flowing liquid comprising communicating a zone having a screened opening with a flowing liquid, continuously passing a diluting liquid into said zone through said screen whereby solids on said screen are removed and expelled from said zone and continuously withdrawing diluted liquid from said zone and through said screen.

10. A method of sampling as set forth in claim 9 in which diluting liquid is introduced into said zone through the outer portion of said screen and diluted sample liquid is withdrawn from said zone through the central portion of said screen to establish a generally counter-current liquid flow in said zone.

No references cited.